(12) United States Patent
He et al.

(10) Patent No.: US 10,768,637 B2
(45) Date of Patent: Sep. 8, 2020

(54) PRIORITIZING VEHICLE NAVIGATION

(71) Applicant: Pony AI, Inc., Grand Cayman (KY)

(72) Inventors: Xing He, Beijing (CN); Xiang Yu, Santa Clara, CA (US); Tiancheng Lou, Milpitas, CA (US); Jun Peng, Fremont, CA (US); Nengxiu Deng, Fremont, CA (US); Hao Song, Sunnyvale, CA (US)

(73) Assignee: Pony AI Inc., Grand Cayman (KY)

( * ) Notice: Subject to any disclaimer, the term of this patent is extended or adjusted under 35 U.S.C. 154(b) by 127 days.

(21) Appl. No.: 16/117,868

(22) Filed: Aug. 30, 2018

(65) Prior Publication Data

US 2020/0073407 A1 Mar. 5, 2020

(51) Int. Cl.
*G05D 1/02* (2020.01)
*G05D 1/00* (2006.01)

(52) U.S. Cl.
CPC ......... *G05D 1/0293* (2013.01); *G05D 1/0088* (2013.01); *G05D 2201/0213* (2013.01)

(58) Field of Classification Search
CPC ............... G05D 1/0293; G05D 1/0088; G05D 2201/0213; G05D 1/0291; G05D 1/02; G05D 1/00; G08G 1/16; G08G 1/0965; H04W 84/00; G01C 21/20
See application file for complete search history.

(56) References Cited

U.S. PATENT DOCUMENTS

| | | | |
|---|---|---|---|
| 5,459,667 A | 10/1995 | Odagaki et al. | |
| 7,222,018 B2 | 5/2007 | Uyeki et al. | |
| 10,262,537 B1* | 4/2019 | Kim | G08G 1/147 |
| 2012/0158299 A1* | 6/2012 | Cerecke | G01C 21/3469 701/533 |
| 2017/0038777 A1* | 2/2017 | Harvey | G05D 1/0295 |
| 2017/0345309 A1* | 11/2017 | Bostick | B60W 30/16 |
| 2019/0035269 A1* | 1/2019 | Donovan | G08G 1/22 |

* cited by examiner

*Primary Examiner* — Adam R Mott
*Assistant Examiner* — Seyyed Mustafa Sahafeyan
(74) *Attorney, Agent, or Firm* — Sheppard Mullin Richter & Hampton LLP

(57) ABSTRACT

Systems, methods, and non-transitory computer readable media may be configured to facilitate prioritization of vehicle navigation. One or more vehicles in an environment of a priority vehicle may be identified. Priorities of the vehicle(s) and the priority vehicle may be determined. A desired navigation of the priority vehicle in the environment may be determined based on the priorities of the vehicle(s) and the priority vehicle. An instruction may be provided to at least one of the vehicle(s) based on the desired navigation of the priority vehicle in the environment. The instruction may characterize one or more maneuvers to be performed by the at least one of the vehicle(s) to facilitate the desired navigation of the priority vehicle.

18 Claims, 6 Drawing Sheets

PRIORITIZING VEHICLE NAVIGATION

FIELD OF THE INVENTION

This disclosure relates to approaches for prioritizing navigation of vehicles.

BACKGROUND

Under conventional approaches, autonomous vehicles may be managed in a collective manner to provide for efficient use of resources. For example, autonomous vehicles may be maneuvered based on traffic conditions to minimize collective travel times for the autonomous vehicles. However, such collective management of autonomous vehicles may not account for the urgency with which one or more of the autonomous vehicles may have to travel. Moreover, presence of non-autonomous vehicles on the road may interfere with collective management of autonomous vehicles on the road.

SUMMARY

Various embodiments of the present disclosure may include systems, methods, and non-transitory computer readable media configured to facilitate prioritization of vehicle navigation. One or more vehicles in an environment of a priority vehicle may be identified. Priorities of the vehicle(s) and the priority vehicle may be determined. A desired navigation of the priority vehicle in the environment may be determined based on the priorities of the vehicle(s) and the priority vehicle. An instruction may be provided to at least one of the vehicle(s) based on the desired navigation of the priority vehicle in the environment. The instruction may characterize one or more maneuvers to be performed by the at least one of the vehicle(s) to facilitate the desired navigation of the priority vehicle.

In some embodiments, the at least one of the vehicle(s) may include a coordinatable vehicle. Providing the instruction to the coordinatable vehicle may include transmitting one or more commands to the coordinatable vehicle. The command(s) may cause the coordinatable vehicle to perform the maneuver(s).

In some embodiments, the coordinatable vehicle may include an autonomous vehicle.

In some embodiments, the at least one of the vehicle(s) may include a non-coordinatable vehicle. Providing the instruction to the non-coordinatable vehicle may include using a signal of the priority vehicle to convey the maneuver(s) to be performed by the non-coordinatable vehicle.

In some embodiments, the non-coordinatable vehicle may include a non-autonomous vehicle, an uncommunicative autonomous vehicle, or an incompatible autonomous vehicle.

In some embodiments, the vehicle(s) may include a coordinatable vehicle and a non-coordinatable vehicle. The at least one of the vehicle(s) to which the instruction is provided may include the coordinatable vehicle. Providing the instruction to the coordinatable vehicle may include transmitting one or more commands to the coordinatable vehicle. The command(s) may cause the coordinatable vehicle to perform the maneuver(s). The maneuver(s) may include a corral maneuver to confine movement of the non-coordinatable vehicle in the environment.

In some embodiments, the instruction may be provided by the priority vehicle to the at least one of the vehicle(s).

In some embodiments, the instruction may be provided by a central server to the at least one of the vehicle(s).

In some embodiments, the priorities of the vehicle(s) and the priority vehicle may be determined based on a vehicle type or a priority bid.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
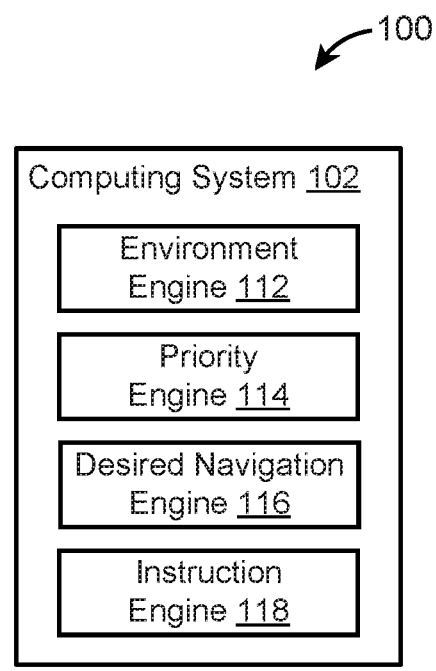
FIG. 1 illustrates an example environment for prioritizing vehicle navigation, in accordance with various embodiments.

In various implementations, a computing system may identify one or more vehicles in an environment of a priority vehicle. Priorities of the vehicle(s) and the priority vehicle may be determined. The priorities of the vehicle(s) and the priority vehicle may be determined based on a vehicle type and/or a priority bid. A desired navigation of the priority vehicle in the environment may be determined based on the priorities of the vehicle(s) and the priority vehicle. An instruction may be provided to one or more vehicles based on the desired navigation of the priority vehicle in the environment. The instruction may be provided to one or more vehicles by the priority vehicle and/or a central server. The instruction may characterize one or more maneuvers to be performed by the vehicle(s) to facilitate the desired navigation of the priority vehicle.

The vehicle(s) in the environment of the priority vehicle may include one or more coordinatable vehicles. A coordinatable vehicle may include an autonomous vehicle. Providing the instruction to a coordinatable vehicle may include transmitting one or more commands to the coordinatable vehicle. The command(s) may cause the coordinatable vehicle to perform the maneuver(s).

The vehicle(s) in the environment of the priority vehicle may include one or more non-coordinatable vehicles. A non-coordinatable vehicle may include a non-autonomous vehicle, an uncommunicative autonomous vehicle, or an incompatible autonomous vehicle. Providing the instruction to a non-coordinatable vehicle may include using a signal of the priority vehicle to convey the maneuver(s) to be performed by the non-coordinatable vehicle.

The vehicle(s) in the environment of the priority vehicle may include one or more coordinatable vehicles and one or more non-coordinatable vehicles. The instructions may be provided to one or more coordinatable vehicles. Providing the instruction to a coordinatable vehicle may include transmitting one or more commands to the coordinatable vehicle. The command(s) may cause the coordinatable vehicle to perform the maneuver(s). The maneuver(s) may include a corral maneuver to confine the movement of one or more non-coordinatable vehicles in the environment.

The approaches disclosed herein facilitate prioritization of vehicle navigation. Based on different priorities of vehicles in an environment, the desired navigation of a priority vehicle may be determined. Other vehicles in the environment may be instructed to move and/or not move within the environment to facilitate the desired navigation of the priority vehicle in the environment. Such prioritization of vehicle navigation may allow vehicles with different priorities to travel with different speed/urgency. Such prioritization of vehicle navigation may maneuver autonomous vehicle(s) to account for the presence of non-autonomous vehicle in the environment. Such prioritization of vehicle navigation may allow for maneuvering of autonomous vehicles in the absence of traffic signals and/or traffic lights.

While the disclosure is described herein with respect to maneuvering of automobiles, this is merely for illustrative purposes and is not meant to be limiting. The approach disclosed herein may be used to prioritize vehicle navigation of different types of vehicles (e.g., automobile, train, boat, ship, submarine, airplane, remote-controlled vehicle). The approach disclosed herein may be used to prioritize vehicle navigation of vehicles in in different types of locations (e.g., on the road, off the road, on a driving track, in the air, in the water).

FIG. 1 illustrates an example environment 100 for prioritizing vehicle navigation, in accordance with various embodiments. The example environment 100 may include a computing system 102. The computing system 102 may include one or more processors and memory. The processor(s) may be configured to perform various operations by interpreting machine-readable instructions stored in the memory. The environment 100 may also include one or more datastores that are accessible to the computing system 102 (e.g., stored in the memory of the computing system 102, coupled to the computing system, accessible via one or more network(s)). In some embodiments, the datastore(s) may include various databases, application functionalities, application/data packages, and/or other data that are available for download, installation, and/or execution.

In various embodiments, the computing system 102 may include an environment engine 112, a priority engine 114, a desired navigation engine 116, an instruction engine 118, and/or other engines. While the computing system 102 is shown in FIG. 1 as a single entity, this is merely for ease of reference and is not meant to be limiting. One or more components/functionalities of the computing system 102 described herein may be implemented, in whole or in part, within a single computing device or within multiple computing devices. One or more portions of the computing system 102 may be implemented within a vehicle (e.g., autonomous vehicle). One or more portions of the computing system may be implemented remotely from a vehicle (e.g., server).

In various embodiments, the environment engine 112 may be configured to identify one or more vehicles in an environment of a priority vehicle. A vehicle may refer to a thing used for transportation. A vehicle may travel on land, on water, under the water, and/or in the air. For example, a vehicle may refer to an automobile, a train, a boat, a ship, a submarine, an airplane, a remote-controlled vehicle, or other vehicle. A priority vehicle may refer to a vehicle that is designated and/or associated with a priority.

An environment of a priority vehicle may refer to physical areas of the priority vehicle, such as one or more portions of surroundings of the priority vehicle. The environment of a priority vehicle may be defined in two-dimensions or three-dimensions. For example, the environment of a priority vehicle may include all areas within a certain distance of the priority vehicle, areas within a two or three-dimensional shape (e.g., circle, oval, sphere, triangle, pyramid, square, cube, rectangle, box, polygon, 3D polygon) centered on the priority vehicle, areas within a two or three-dimensional shape including but not centered on the priority vehicle, or areas within a two or three-dimensional shape not including the priority vehicle. The environment of a priority vehicle may include one or more portions of a road on which the priority vehicle is traveling. The environment of a priority vehicle may include one or more portions of a road which may impact the travel of the priority vehicle, such as a road that intersects with a road on which the priority vehicle is traveling. The environment of a priority vehicle may include one or more portions of a lane on which the priority vehicle is traveling. The environment of a priority vehicle may include one or more portions of a lane which may impact the travel of the priority vehicle, such as a lane near or adjacent to a lane on which the priority vehicle is traveling.

An environment of a priority vehicle may include one or more vehicles besides the priority vehicle. The identification of vehicle(s) in an environment of a priority vehicle may include the identification of the priority vehicle and/or other vehicle(s) in the environment. Identification of a vehicle may include identification of the identity of the vehicle, identification of the type of the vehicle, identification of the location of the vehicle, identification of the movement of the vehicle, identification of a planned route of the vehicle, and/or identification of other information relating to the vehicle.

Vehicles in the environment may be identified based on visual information or non-visual information. For example, one or more cameras (e.g., camera(s) carried by a vehicle, camera(s) affixed to a location) may be within or near the environment. Some or all of the environment may be within the field(s) of view of the camera(s). A vehicle in the environment may be identified based on visual information (e.g., images, videos) generated by the camera(s). That is, visual information generated by the camera(s) may be analyzed to identify the vehicle. As another example, a vehicle in the environment may be transmitting its identification information (e.g., identity, vehicle type, priority), location information (e.g., location, movement, planned route)), and/or other information. The vehicle may be identified based on the transmitted information. For example, a vehicle may be transmitting its information to another vehicle (e.g., a priority vehicle, autonomous vehicle), a server (e.g., a local server, a central server managing movements and/or routes), and/or other communication devices, and the vehicles in the environment may be identified based on the identification information transmitted by the vehicle. For instance, a priority vehicle may receive identification and location information of vehicles in its environment from the vehicles and identify those vehicles based on the received information. A local server or a central server may receive identification and location information of vehicles in various areas and may identify vehicles within an environment of a priority vehicle, such as based on distance from the priority vehicle, based on road and/or lane on which the priority vehicle is traveling, and/or other factors.

One or more vehicles in an environment of a priority vehicle may include one or more coordinatable vehicles. A coordinatable vehicle may refer to a vehicle whose operation, such as maneuvering within the environment of the priority vehicle, may be coordinated by another device, such as a priority vehicle, a local server, a central server, and/or other communication devices. A coordinatable vehicle may include an autonomous vehicle. An autonomous vehicle may refer to a vehicle that is capable of navigating within an environment without human input. An autonomous vehicle may be fully autonomous or partially autonomous. The coordinatable vehicle may be configured to receive one or more instructions from a priority vehicle, a central server, a local server, and/or other communication devices. The coordinatable vehicle may maneuver within the environment based on the received instruction(s).

One or more vehicles in an environment of a priority vehicle may include one or more non-coordinatable vehicles. A non-coordinatable vehicle may refer to a vehicle whose operation, such as maneuvering within the environment of the priority vehicle, may not be coordinated by another device, such as a priority vehicle, a local server, a central server, or other communication devices. A non-coordinatable vehicle may include a non-autonomous vehicle, an uncommunicative autonomous vehicle, or an incompatible autonomous vehicle. A non-autonomous vehicle may refer to a vehicle that is not capable of navigating within an environment without human input. An uncommunicative autonomous vehicle may refer to an autonomous vehicle that does not or cannot communicate with a priority vehicle, a local server, and/or the central server to receive instructions on how to maneuver within the environment of the priority vehicle. An incompatible autonomous vehicle may refer to an autonomous vehicle that cannot receive and/or interpret instructions on how to maneuver within the environment of a priority vehicle. The non-coordinatable vehicle may not be configured to receive one or more instructions from a priority vehicle, a local server, a central server, and/or other communication devices. The non-coorientable vehicle may not maneuver within the environment even when it receives instruction(s) from a priority vehicle, a local server, a central server, or other communication devices.

In various embodiments, the priority engine 114 may be configured to determine priorities of the vehicles in the environment of the priority vehicle. The priority engine 114 may determine priorities of the priority vehicle and other vehicle(s) in the environment. A priority of a vehicle may refer to a quality or a state of importance of the vehicle, a quality or a state of the vehicle having the right to take precedence over other vehicle, and/or a quality or a state of the vehicle being allowed to proceed before other vehicles. A priority of a vehicle may be static or dynamic. A priority of a vehicle may not change over time, location, environmental conditions, passenger(s) within the vehicle, and/or other dynamic conditions within or around the vehicle. A priority of a vehicle may change over time, location, environmental conditions, passenger(s) within the vehicle, and/or other dynamic conditions within or around the vehicle.

The priority engine 114 may determine a priority of a vehicle based on identification information of the vehicle. For example, a particular identity (e.g., VIN number, vehicle identifier) of a vehicle may be associated with a particular priority within a database and the priority engine 114 may determine the priority of the vehicle by finding the associated priority of the vehicle identity within the database. As another example, different types of vehicles may be associated with different priorities and the priority engine 114 may determine the priority of the vehicle based on the type of the vehicle. For instance, a police vehicle, an ambulance, or a vehicle with a sick passenger may be associated with a higher priority than other vehicles. In some instances, the priority of the vehicle may depend on the operation of the vehicle. For example, a ambulance that is responding to an alert or an emergency may have a higher priority than ambulance that is returning to its home station for rest. As another example, different vehicles may be associated with different priorities based on one or more priority bids and the priority engine 114 may determine the priority of the vehicle based on priority bid(s). A priority bid may refer to an offer/acceptance, an order, or a request relating to the priority of a vehicle. For example, a person or an organization may purchase a priority of a certain level for a vehicle. As another example, a person with a sick passenger may request a priority of a certain level for a vehicle from a doctor, a hospital, or an emergency medical service. Other determination of priorities for priority vehicles are contemplated.

In various embodiments, the desired navigation engine 116 may be configured to determine a desired navigation of the priority vehicle in the environment of the priority vehicle based on (1) the priorit(ies) of the vehicle(s) in the environment of the priority vehicle, (2) the priority of the priority vehicle, and/or other information. A desired navigation of the priority vehicle may refer to a desired movement of the priority vehicle in the environment. A desired navigation of the priority vehicle may include a particular route for the priority vehicle to take within the environment. A desired navigation of the priority vehicle may include one or more operations to be performed by the priority vehicle within the environment. A desired navigation of the priority vehicle may characterize how the vehicle may be moved within the environment. For example, a desired navigation of the priority vehicle may characterize in what direction(s) and with what speed(s) the priority vehicle is desired to be moved from one location of the environment to another location of the environment. As another example, a desired navigation of the priority vehicle may characterize how the priority vehicle should be moved to enter the environment and/or exit the environment. The desired navigation of the priority vehicle may include a change in a prior navigation of the priority vehicle or the priority vehicle maintaining the prior navigation of the priority vehicle. The desired navigation of the priority vehicle may include one or more changes in speed and/or direction in which the priority vehicle is moving.

The desired navigation engine 116 may determine the relative importance that should be given to a priority vehicle based on the priority of the priority vehicle and other vehicle(s) in the environment. The desired navigation engine 116 may use the relative importance of the priority vehicle to determine the desired navigation of the priority vehicle. For example, the desired navigation engine 116 may determine that the priority vehicle is behind vehicles that have less priority than the priority vehicle. Based on the priority vehicle having the highest priority among the vehicles in the environment, the desired navigation engine 116 may determine the desired navigation of the priority vehicle to include the priority vehicle passing the other vehicles. As another example, the desired navigation engine 116 may determine that the priority vehicle is stopped at an intersection with another car that have less priority than the priority vehicle, and the desired navigation engine 116 may determine the desired navigation of the priority vehicle to include the priority vehicle going through the intersection before the other vehicle. As yet another example, the desired navigation engine 116 may determine that the priority vehicle is in front of another vehicle with higher priority. Based on the priority vehicle having less priority than the vehicle behind it, the desired navigation engine 116 may determine the desired navigation of the priority vehicle to include the priority vehicle allowing the other vehicle to pass it. Thus, the desired navigation engine 116 may facilitate automatic navigation of vehicles based on the priorities of the vehicles.

In various embodiments, the instruction engine 118 may be configured to provide one or more instructions to one or more vehicles based on the desired navigation of the priority vehicle in the environment and/or other information. The instruction(s) may characterize one or more maneuvers to be performed by the vehicle(s) to facilitate the desired navigation of the priority vehicle. The instruction(s) may include one or more commands for the vehicle(s) to perform the desired maneuver(s). A maneuver may refer to a particular movement and/or particular operation of a vehicle. For example, a maneuver may include a movement of a vehicle in one or more particular directions (e.g., straight movements, curved movements). A maneuver may include a movement of a vehicle with one or more particular speeds (e.g., moving at a particular speed, increasing speed, decreasing speed, stopping movement, starting movement). The vehicle(s) may perform the maneuver characterized by the instruction(s) based on reception of the instruction(s).

The instruction(s) may be provided to the priority vehicle and/or other vehicles. For example, an instruction characterizing one or more maneuvers to be performed by the priority vehicle to perform the desired navigation may be provided to the priority vehicle. For instance, one or more commands may be transmitted to the priority vehicle and the command(s) may cause the priority vehicle to perform the maneuver(s), which may result in the desired navigation of the priority vehicle. As another example, an instruction characterizing one or more maneuvers to be performed by a vehicle in the environment of the priority vehicle may be provided to the vehicle. For instance, the vehicle in the environment of the priority vehicle may include a coordinatable vehicle, and one or more commands may be transmitted to the coordinatable vehicle. The command(s) may cause the coordinatable vehicle to perform the maneuver(s), which may facilitate the desired navigation of the priority vehicle. For example, a desired navigation of the priority vehicle may include the priority vehicle passing a coordinatable vehicle in front of the priority vehicle, and the command(s) transmitted to the coordinatable vehicle may cause the coordinatable vehicle to perform a lane-changing maneuver, facilitating the priority vehicle's passing of the coordinatable vehicle.

Instruction(s) may be provided by the instruction engine 118 to account for one or more non-coordinatable vehicles in the environment of the priority vehicle. For example, a desired maneuver of the priority vehicle may include a lane change by the priority vehicle. The lane to which the priority vehicle is to move into may be occupied by a non-coordinatable vehicle. Instruction(s) may be provided to the non-coordinatable vehicle by sending instruction(s) to the priority vehicle, which may cause the priority vehicle to use its signal (e.g., turn signal) to convey the maneuver(s) to be performed by the non-coordinatable vehicle. For instance, the use of the turn signal by the priority vehicle may convey to the non-coordinatable vehicle that the desired maneuver to be performed by the non-coordinatable vehicle includes speeding up, slowing down, or changing lanes to make space in the lane for the priority vehicle.

As another example, the environment of the priority vehicle may include one or more coordinatable vehicles and one or more non-coordinatable vehicles. Instruction(s) provided by the instruction engine 118 to the coordinatable vehicle(s) may characterize maneuver(s) to be performed by the coordinatable vehicle(s) to account for one or more of the non-coordinatable vehicles in the environment. For instance, a desired maneuver of the priority vehicle may include a lane change by the priority vehicle. The lane to which the priority vehicle is to move into may be occupied by a non-coordinatable vehicle. A coordinatable vehicle may be in front of the non-coordinatable vehicle. Instruction(s) may be provided to the coordinatable vehicle by transmitting one or more commands to the coordinatable vehicle. The command(s) may cause the coordinatable vehicle to perform maneuver(s), which may facilitate the desired navigation of the priority vehicle. For example, the maneuver(s) performed by the coordinatable vehicle may include a corral maneuver to confine movement of the non-coordinatable vehicle behind the coordinatable vehicle. A corral maneuver may refer to a maneuver that confines or pushes other vehicle(s) in a particular direction, to a particular location, to use particular speeds, and/or otherwise confine the movement of the other vehicle(s) in the environment. For instance, the maneuver(s) performed by the coordinatable vehicle may include a slow-down maneuver to push the non-coordinatable vehicle behind the space in the lane to which the priority vehicle may move to perform the desired navigation.

The instruction(s) may be provided to one or more vehicles in an environment by a server. A server may refer to a computer or a computer programs that acts as a centralized resource and/or a centralized service for facilitating navigation of vehicles. A server may be located in the environment of the priority vehicle (e.g., a local server) or communicate with vehicles through an intermediary communication device (e.g., a central sever communicating with vehicles through a communication device on a street lamp, a street sign, or a building). For instance, a server may determine which vehicles in an environment of a priority vehicle are coordinatable, determine the priorities of the vehicles in the environment, determine a desired navigation of the priority vehicle, and/or provide instructions to the coordinatable vehicles and/or the priority vehicle to perform maneuver(s) to facilitate the desired navigation by the priority vehicle. For example, a server may provide instruction(s) to a coordinatable vehicle in front of the priority vehicle to change lanes and/or provide instruction(s) to the priority vehicle to pass the coordinatable vehicle. A server may provide instruction(s) to coordinatable vehicle to account for non-coorientable vehicles in the environment.

As another example, a server may provide instruction(s) to all vehicles in an environment to coordinate the navigation of all vehicles. Such navigation of vehicles may allow for more efficient usage of road/lane resources and provide for reduction of collective travel times for the vehicles. A server may determine the desired navigation of the priority vehicle and/or the maneuver(s) to be performed by the coordinatable vehicle to minimize the impact of the desired navigation on the coorientable vehicle and/or other vehicles.

The instruction(s) may be provided to one or more vehicles in an environment by a priority vehicle. For example, the priority vehicle may determine which vehicles in its environment are coordinatable, determine the priorities of the vehicles in the environment, determine its desired navigation, and/or provide instructions to the coordinatable vehicles to perform maneuver(s) to facilitate the desired navigation by the priority vehicle. The priority vehicle may transmit commands to multiple vehicles at once or one a vehicle-by-vehicle basis. For example, the priority vehicle may broadcast commands to be received by multiple vehicles in the environment, with different commands associated with different vehicles. The vehicles may determine the appropriate commands based on the association of commands with vehicles (e.g., commands including particular vehicle identifier). As another example, the priority vehicle may transmit commands to a coordinatable vehicle when the need arises. For instance, the priority vehicle may transmit commands to a coordinatable vehicle in front of the priority vehicle when the priority vehicle is ready to pass the coordinatable vehicle.

Figure 2:
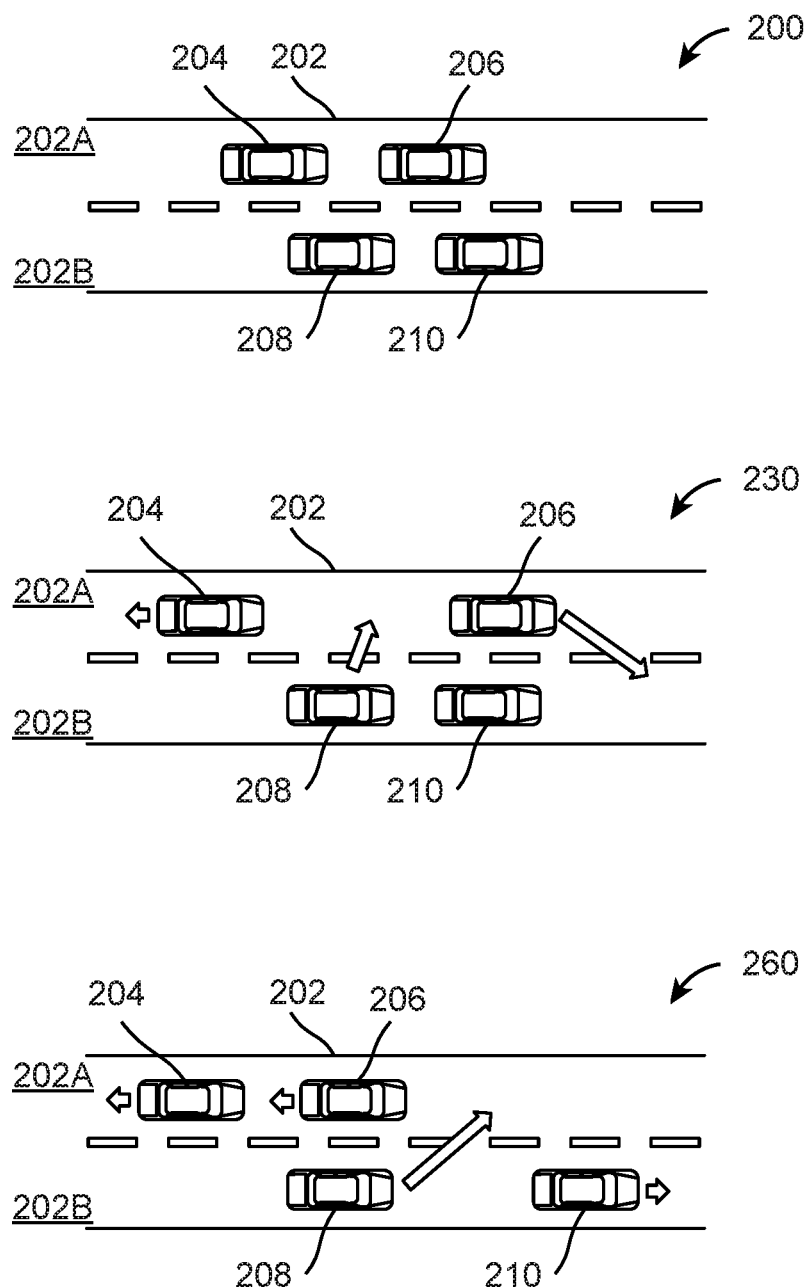
FIG. 2 illustrates example scenarios for prioritizing vehicle navigation, in accordance with various embodiments.

FIG. 2 illustrates example scenarios 200, 230, 260 for prioritizing vehicle navigation, in accordance with various embodiments. The scenarios 200, 230, 260 may include a road 202, which may be divided into a lane 202A and a lane 202B. Vehicles 204, 206 may be on the lane 202A. Vehicle 208, 210 may be on the lane 202B. The vehicle 208 may be a priority vehicle with the highest priority in the environment. The vehicles 204, 206, 210 may be coordinatable vehicle.

A desired navigation of the priority vehicle 208 may include the priority vehicle 208 changing from the lane 202B to the lane 202A and passing the vehicles 204, 206, 210. Instructions may be provided to one or more of the coordinatable vehicles 204, 206, 210 and/or the priority vehicle 208. The instructions may characterize one or more maneuvers to be performed by one or more of the coordinatable vehicles 204, 206, 210 and/or the priority vehicle 208.

For example, the instructions provided to the vehicles 204, 206, 208, 210 may cause the vehicles 204, 206, 208, 210 from being arranged as shown in the scenario 200 to being arranged as shown in the scenario 230. The vehicle 204 may perform a slow-down maneuver to create a space for the priority vehicle on the lane 202A in front of the vehicle 204. The vehicle 206 may perform a speed-up maneuver and a lane-change maneuver to move in front of the vehicle 210 on the lane 202B. The priority vehicle 208 may perform a lane-change maneuver to move in front of the vehicle 204 on the lane 202A and then perform a speed-up maneuver to pass the vehicles 206, 210.

As another example, the instructions provided to the vehicles 204, 206, 208, 210 may cause the vehicles 204, 206, 208, 210 from being arranged as shown in the scenario 200 to being arranged as shown in the scenario 260. The vehicles 204, 206 may perform a slow-down maneuver to create a space for the priority vehicle on the lane 202A in front of the vehicles 204, 206. The vehicle 210 may perform a speed-up maneuver to create a space behind the vehicle 210 in the lane 202B for the priority vehicle 208. The priority vehicle 208 may perform a speed-up maneuver and a lane-change maneuver to move in front of the vehicles 204, 206 on the lane 202A. and then perform a speed-up maneuver to pass the vehicle 210.

The differences in the scenarios 230, 260 may be caused by priorit(ies) of one or more of the vehicles 204, 206, 210. For example, the scenario 230 may include the vehicle 206 in front of the vehicle 210, and the vehicles 204, 206, 210 may be maneuvered as shown in the scenario 230 based on the vehicle 206 having higher priority than the vehicle 210. As another example, the scenario 260 may include the vehicle 210 in front of the vehicle 206, and the vehicles 204, 206, 210 may be maneuvered as shown in the scenario 260 based on the vehicle 210 having higher priority than the vehicle 206.

Figure 3:
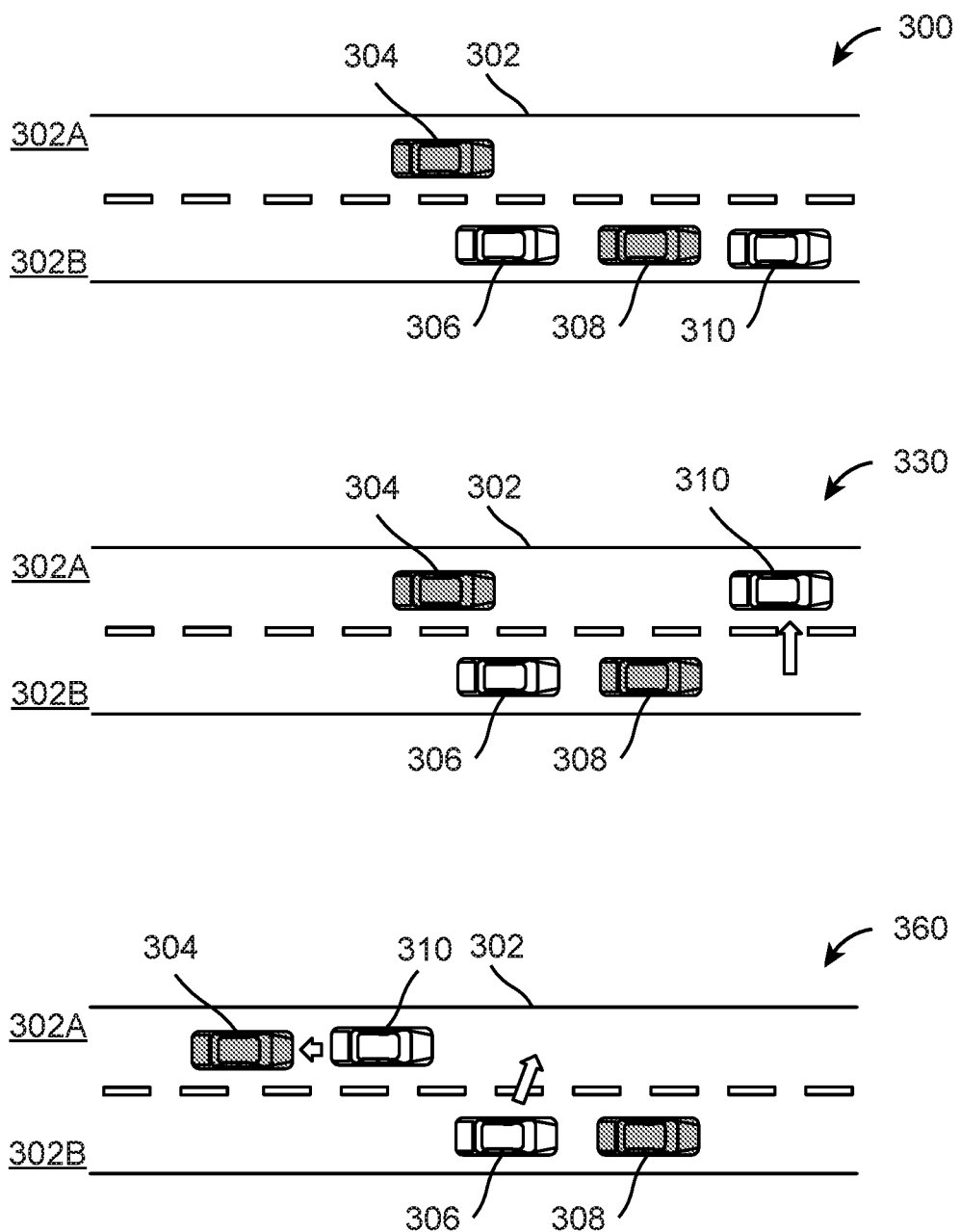
FIG. 3 illustrates example scenarios for prioritizing vehicle navigation, in accordance with various embodiments.

FIG. 3 illustrates example scenarios 300, 330, 360 for prioritizing vehicle navigation, in accordance with various embodiments. The scenarios 300, 330, 360 may include a road 302, which may be divided into a lane 302A and a lane 302B. A vehicle 304 may be on the lane 302A. The vehicle 304 may be a non-coordinatable vehicle. Vehicles 306, 308, 310 may be on the lane 302B. The vehicle 306 may be a priority vehicle with the highest priority in the environment. The vehicle 308 may be a non-coordinatable vehicle. The vehicle 310 may be a coordinatable vehicle.

A desired navigation of the priority vehicle 306 may include the priority vehicle 306 changing from the lane 302B to the lane 302A and passing the vehicles 304, 308, 310. Instructions may be provided to the coordinatable vehicle 310 and/or the priority vehicle 306. The instructions may characterize one or more maneuvers to be performed by the coordinatable vehicle 310 and/or the priority vehicle 306.

For example, the instructions provided to the vehicles 306, 310 may cause the vehicles 304, 306, 308, 310 from being arranged as shown in the scenario 300 to being arranged as shown in the scenario 330, and then to being arranged as shown in the scenario 360. The vehicle 310 may perform a lane-change maneuver to move in front of the vehicle 304 on the lane 302A, as shown in the scenario 330. The vehicle 310 may then perform a slow-down maneuver to push/corral the vehicle 304 behind the priority vehicle 306, as shown in the scenario 360. The priority vehicle 306 may perform a speed-up maneuver and a lane-change maneuver to move in front of the vehicles 304, 310 on the lane 302A, and then perform a speed-up maneuver to pass the vehicle 308.

Figure 4:
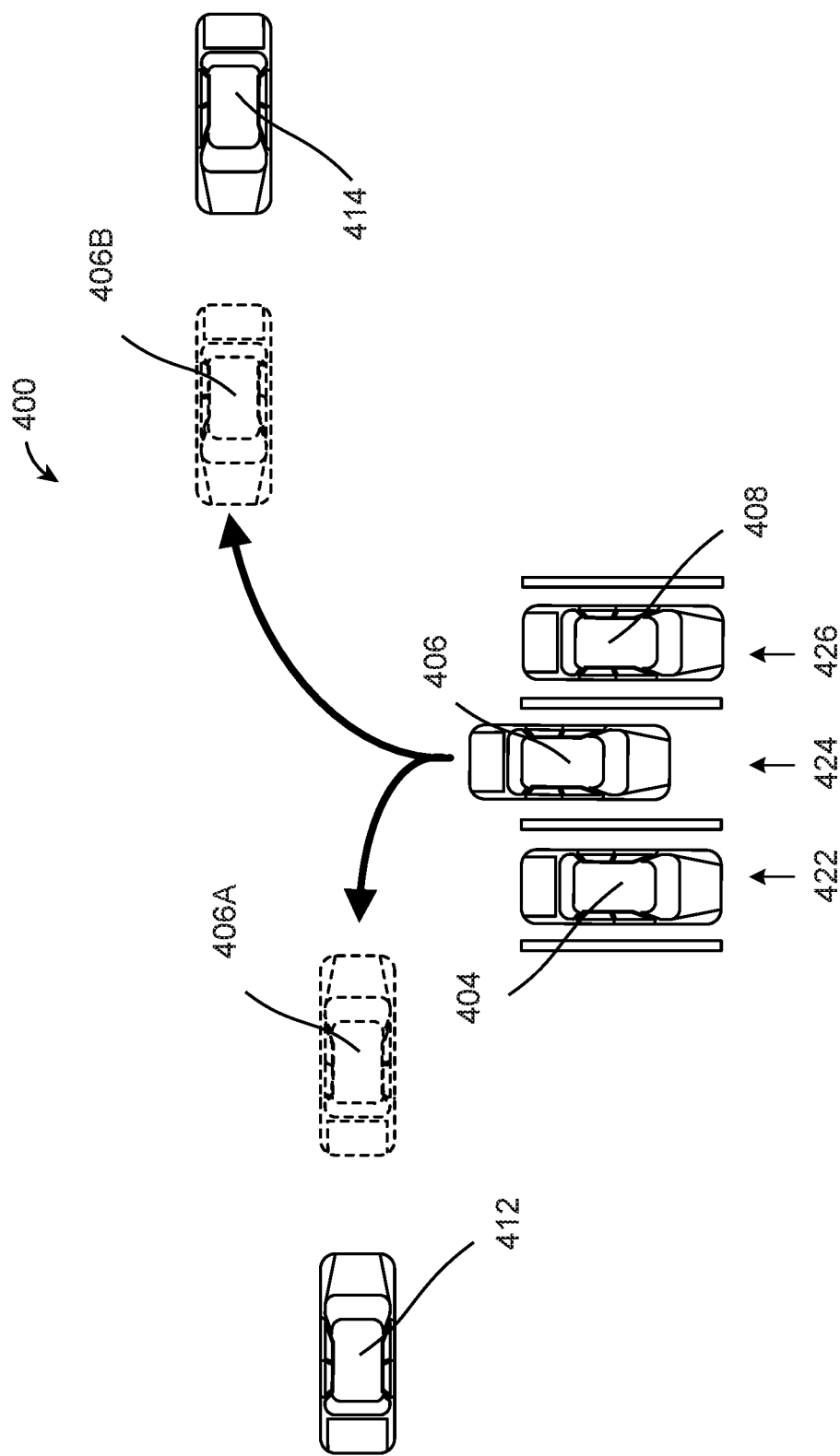
FIG. 4 illustrates an example scenario for prioritizing vehicle navigation, in accordance with various embodiments.

FIG. 4 illustrates an example scenario 400 for prioritizing vehicle navigation, in accordance with various embodiments. The scenario 400 may include a parking lot with parking spaces 422, 424, 426, which may be occupied by vehicles 404, 406, 408. The scenario 400 may include vehicles 412, 414 that are looking for parking spaces. The vehicle 424 may be leaving the parking space 424. For example, the vehicle 424 may be leaving the parking lot. As another example, the vehicle 424 may have lower priority than the vehicles 412, 414 and may be provided with instructions to maneuver into another parking space (e.g., more distant parking space). The vehicle 406 may maneuver into a position 406A or a position 406B based on the priorities of the vehicles 412, 414. For example, based on the vehicle 412 having higher priority than the vehicle 414, the vehicle 406 may move into the position 406B to confine the vehicle 414 while the vehicle 412 maneuvers into the parking space 424. As another example, based on the vehicle 414 having higher priority than the vehicle 412, the vehicle 406 may move into the position 406A to confine the vehicle 412 while the vehicle 414 maneuvers into the parking space 424.

Figure 5:
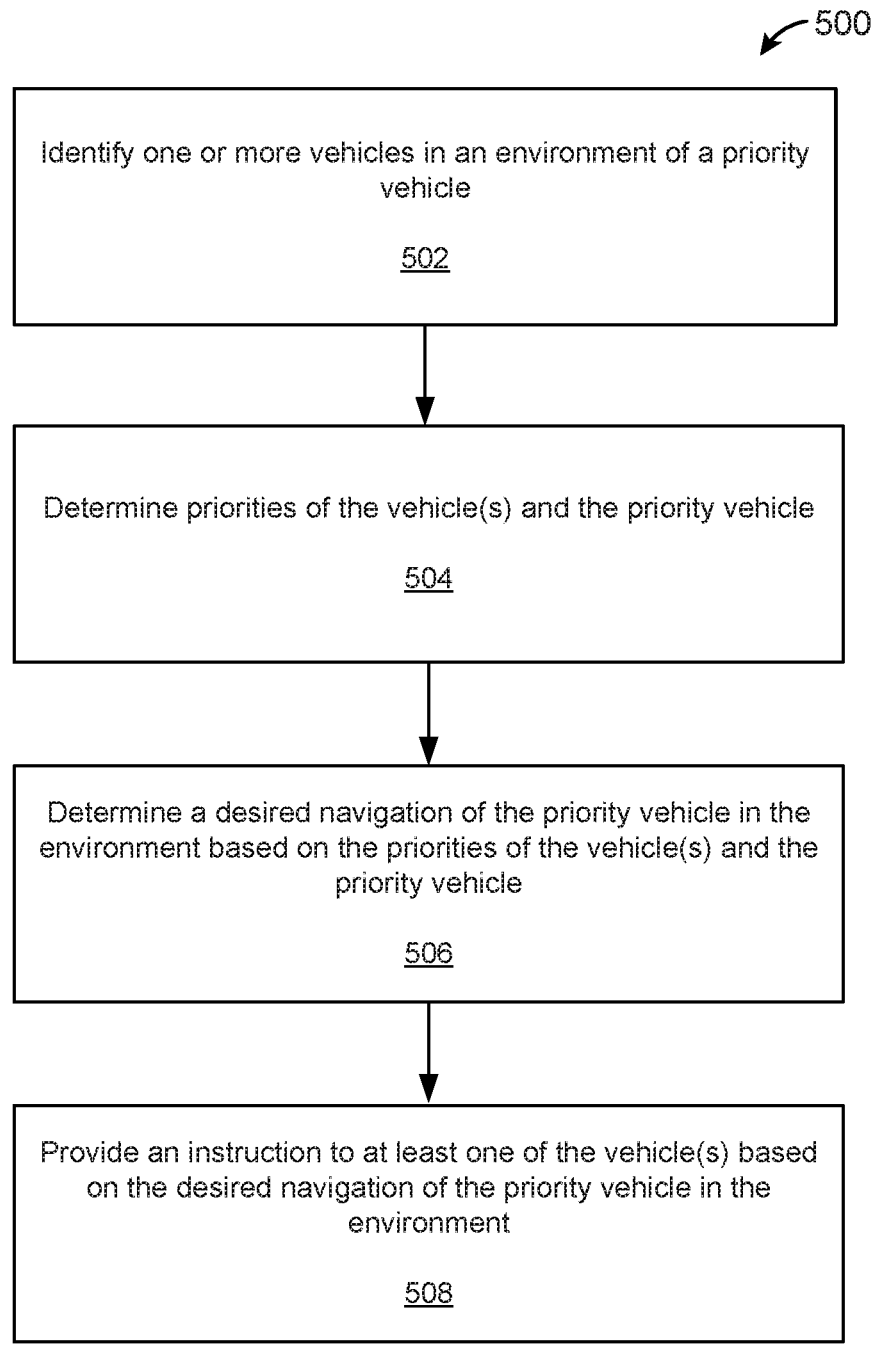
FIG. 5 illustrates a flowchart of an example method, in accordance with various embodiments.

FIG. 5 illustrates a flowchart of an example method 500, according to various embodiments of the present disclosure. The method 500 may be implemented in various environments including, for example, the environment 100 of FIG. 1. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, one or more vehicles in an environment of a priority vehicle may be identified. At block 504, priorities of the vehicle(s) and the priority vehicle may be determined. At block 506, a desired navigation of the priority vehicle in the environment may be determined based on the priorities of the vehicle(s) and the priority vehicle. At block 508, an instruction may be provided to at least one of the vehicle(s) based on the desired navigation of the priority vehicle in the environment. The instruction may characterize one or more maneuvers to be performed by the at least one of the vehicle(s) to facilitate the desired navigation of the priority vehicle.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
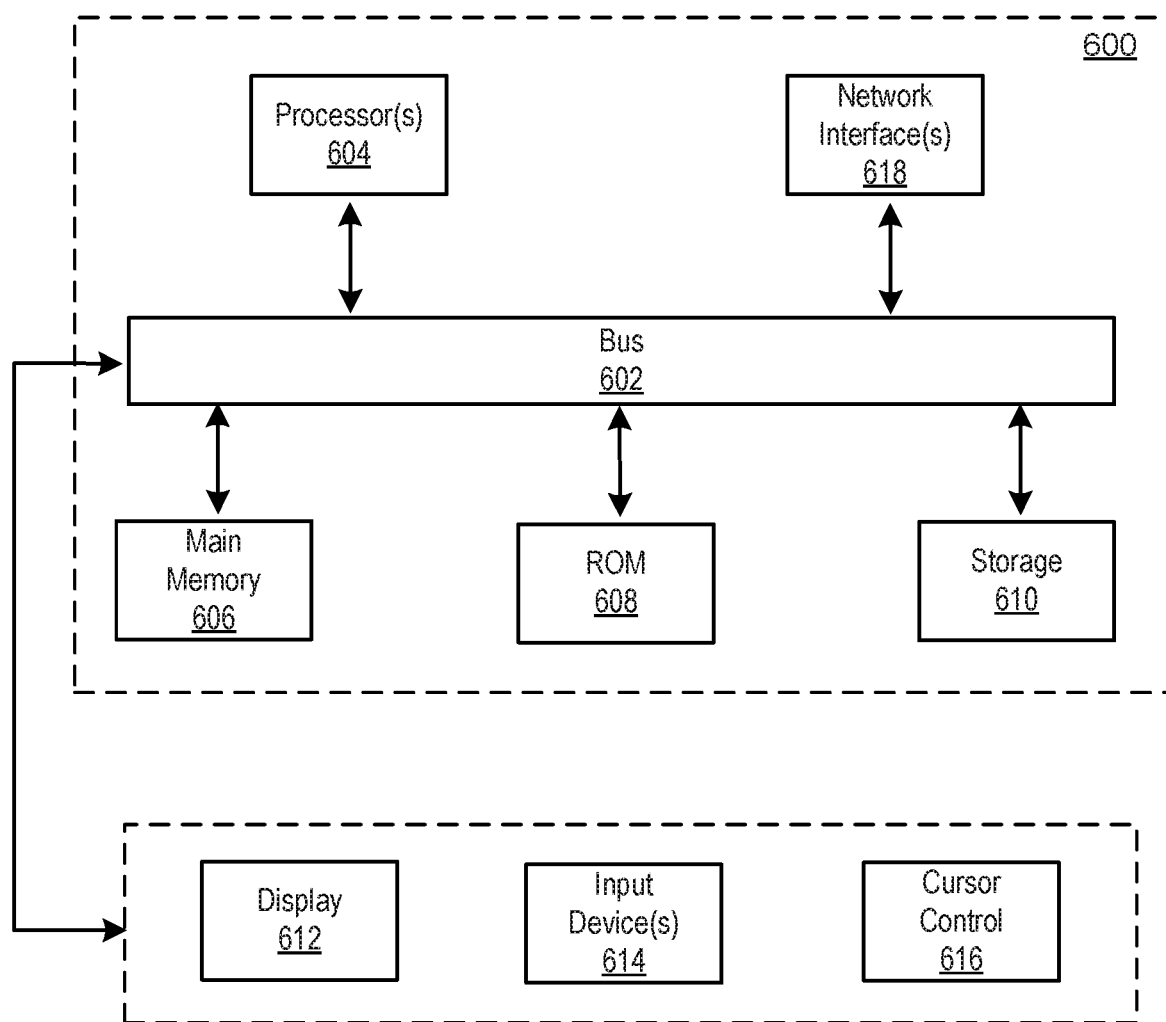
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
one or more processors; and
a memory storing instructions that, when executed by the one or more processors, cause the system to perform:
identifying vehicles in an environment of a priority vehicle, wherein the vehicles include a first vehicle configured to receive direct commands from the system and second and third vehicles that do not receive direct commands from the system, the first vehicle being in front of the third vehicle, and the third vehicle being in front of the priority vehicle, determining relative priorities of the first vehicle and the priority vehicle, the priority vehicle determined to have a higher priority than the first vehicle;

determining a desired navigation of the priority vehicle in the environment based on the relative priorities of the first vehicle and the priority vehicle; and providing an instruction to the first vehicle based on the desired navigation of the priority vehicle in the environment, the instruction characterizing one or more maneuvers to be performed by the first vehicle to facilitate the desired navigation of the priority vehicle, wherein:

in response to the priority vehicle being obstructed by the second vehicle and the third vehicle, the instruction comprises commanding the first vehicle to move in front of the second vehicle, and to reduce a speed of the first vehicle to a speed lower than a speed of the third vehicle.

2. The system of claim 1, wherein the first vehicle includes an autonomous vehicle.

3. The system of claim 1, wherein the instructions further cause the system to perform:

providing an instruction to the second vehicle using a signal of the priority vehicle to convey one or more maneuvers to be performed by the priority vehicle.

4. The system of claim 1, wherein the second vehicle includes a non-autonomous vehicle, an uncommunicative autonomous vehicle, or an incompatible autonomous vehicle.

5. The system of claim 1, wherein the instructions further cause the system to perform:

providing an instruction to the first vehicle and a fourth vehicle configured to receive direct commands from the system, the instruction including a command causing that causes the first and fourth vehicles to perform one or more maneuvers to confine a movement of the second vehicle in the environment.

6. The system of claim 1, wherein the instruction is provided by the priority vehicle to the first vehicle.

7. The system of claim 1, wherein the instruction is provided by a central server to the first vehicle.

8. The system of claim 1, wherein the relative priorities of the first vehicle and the priority vehicle are determined based on a vehicle type or a priority bid.

9. The system of claim 1, wherein the instructions further cause the system to perform:

sending a second instruction to the priority vehicle or the first vehicle, the second instruction commanding the priority vehicle or the first vehicle to signal for the second vehicle to perform a second maneuver.

10. The system of claim 1, wherein the first vehicle, the third vehicle, and the priority vehicle are travelling on a first lane, the second vehicle is on a second lane adjacent to the first lane, and the instruction provides:

a command to the first vehicle to switch to the second lane in front of the second vehicle; and a second command to the priority vehicle to pass the second vehicle and the first vehicle.

11. A method implemented by a computing system including one or more processors and storage media storing machine-readable instructions, wherein the method is performed using the one or more processors, the method comprising:

identifying vehicles in an environment of a priority vehicle, wherein the vehicles include a first vehicle configured to receive direct commands from the system and second and third vehicles that do not receive direct commands from the system, the first vehicle being in front of the third vehicle, and the third vehicle being in front of the priority vehicle;

determining relative priorities of the first vehicle and the priority vehicle, the priority vehicle determined to have a higher priority than the first vehicle;

determining a desired navigation of the priority vehicle in the environment based on the relative priorities of the first vehicle and the priority vehicle; and providing an instruction to the first vehicle based on the desired navigation of the priority vehicle in the environment, the instruction characterizing one or more maneuvers to be performed by the first vehicle to facilitate the desired navigation of the priority vehicle, wherein:

in response to the priority vehicle being obstructed by the second vehicle and the third vehicle, the instruction comprises commanding the first vehicle to move in front of the second vehicle, and to reduce a speed of the first vehicle to a speed lower than a speed of the third vehicle.

12. The method of claim 11, further comprising:

providing an instruction to the second vehicle using a signal of the priority vehicle to convey one or more maneuvers to be performed by the priority vehicle.

13. The method of claim 11, wherein the second vehicle includes a non-autonomous vehicle, an uncommunicative autonomous vehicle, or an incompatible autonomous vehicle.

14. The method of claim 11, further comprising:

providing an instruction to the first vehicle and a fourth vehicle configured to receive direct commands from the system, the instruction including a command that causes the first and fourth vehicles to perform one or more maneuvers to confine a movement of the second vehicle in the environment.

15. The method of claim 11, wherein the instruction is provided by the priority vehicle to the first vehicle.

16. The method of claim 11, wherein the instruction is provided by a central server to the first vehicle.

17. The method of claim 11, wherein the respective priorities of the first vehicle and the priority vehicle are determined based on a vehicle type or a priority bid.

18. A non-transitory computer readable medium comprising instructions that, when executed, cause one or more processors to perform:

identifying vehicles in an environment of a priority vehicle, wherein the vehicles include a first vehicle configured to receive direct commands from the system and second and third vehicles that do not receive direct commands from the system, the first vehicle being in front of the third vehicle, and the third vehicle being in front of the priority vehicle;

determining relative priorities of the first vehicle and the priority vehicle, the priority vehicle determined to have a higher priority than the first vehicle;

determining a desired navigation of the priority vehicle in the environment based on the relative priorities of the first vehicle and the priority vehicle, and based on a collective travel time for the first vehicle and the priority vehicle; and providing an instruction to the first vehicle based on the desired navigation of the priority vehicle in the environment, the instruction characterizing one or more maneuvers to be performed by the first vehicle to facilitate the desired navigation of the priority vehicle, wherein:

in response to the priority vehicle being obstructed by the second vehicle and the third vehicle, the instruction comprises commanding the first vehicle to move in front of the second vehicle, and to reduce a speed of the first vehicle to a speed lower than a speed of the third vehicle.

\* \* \* \* \*